(12) United States Patent
Tommei

(10) Patent No.: US 6,412,800 B1
(45) Date of Patent: Jul. 2, 2002

(54) UNIVERSAL KIT FOR THE APPLICATION OF AN ELECTRIC MOTOR ON A STANDARD BICYCLE TRANSFORMING SAME BICYCLE INTO A BICYCLE WITH PEDAL ASSIST FROM THE ELECTRIC MOTOR

(76) Inventor: Fabrizio Tommei, Via A. Cesari, 53, 00152 Rome (IT)

( * ) Notice: Subject to any disclaimer, the term of this patent is extended or adjusted under 35 U.S.C. 154(b) by 0 days.

(21) Appl. No.: 09/799,174

(22) Filed: Mar. 5, 2001

(51) Int. Cl.[7] .............................. B62K 17/00; B62M 1/00
(52) U.S. Cl. ........................................ 280/220; 280/205
(58) Field of Search ................................. 280/205–207, 280/220; 474/84

(56) References Cited

U.S. PATENT DOCUMENTS 3,921,745 A * 11/1975 McCulloch et al. ........ 180/205
4,085,814 A * 4/1978 Davidson et al. ........... 180/206
4,397,369 A * 8/1983 Read ........................... 180/205
5,937,964 A * 8/1999 Mayer et al. ................ 180/205
6,119,801 A * 9/2000 Yamashita et al. .......... 180/205
6,152,251 A * 11/2000 Nagai et al. ................. 180/205
6,269,898 B1 * 8/2001 Mayer et al. ................ 180/205
6,296,072 B1 * 10/2001 Turner ......................... 180/205

* cited by examiner

Primary Examiner—Brian L. Johnson
Assistant Examiner—Matthew Luby

(57) ABSTRACT

A kit for universal use with standard bicycles includes an electrical motor which is mountable to the pedal axle of a bicycle, the electric motor having permanent magnets, an electronic control for these motor magnets, batteries and a reduction gear based upon the motor's number of revolutions per minute. The kit uses special sensors which register the pedal rotation rate and the pressure exerted by the bicyclist upon the pedals, which information is processed by a control device which controls actuation of the electric motor as such is required by the bicyclist.

18 Claims, 3 Drawing Sheets

UNIVERSAL KIT FOR THE APPLICATION OF AN ELECTRIC MOTOR ON A STANDARD BICYCLE TRANSFORMING SAME BICYCLE INTO A BICYCLE WITH PEDAL ASSIST FROM THE ELECTRIC MOTOR

FIELD OF THE INVENTION

This invention relates generally to bicycles and other pedal vehicles. More particularly, it relates to a motor-assisted apparatus in the form of an assembly, or kit, which may be added to any existing bicycle to convert the bicycle from one which moves by pedal power alone to one which moves by pedal power, by motor-assisted power or by a combination of both. Use of this kit with a conventional bicycle serves to aid the bicyclist in negotiating steep gradients and other road situations with a lesser degree of effort given the normal physical conditions of the average bicyclist.

BACKGROUND OF THE INVENTION

Bicyclists frequently encounter steep gradients and other road situations which can require exceptional physical strength to negotiate and which can be extremely difficult for cyclists who are not physically well trained. Such situations can over-burden the bicyclist's muscles and cardiovascular system. In the experience of this inventor, there are a number of different applications which utilize auxiliary electrical motors added to a typical bicycle. For example, one such system affixes the electrical motor inside the wheel hub. This system requires that the electrical motor which is utilized be a small one, due to obvious space limitations. This, in turn, results in the motor providing a relatively low power level and a reduced static torque. It also results in an excessive weight burden on the wheel.

Another application known to this inventor affixes the electrical motor to the rear wheel axle of the bicycle. The electrical motor is utilized with a worm screw reduction gear which causes a considerable drop in efficiency under stress. Additionally, the motor and the batteries which are used in such an application create a considerable amount of weight on the bicycle's rear axle. This tends to make the bicycle off-balance and renders any over-dimensioning of the bicycle chassis totally useless. Insofar as the bicycle chassis must carry out this difficult task, it results in further unbalancing of the bicycle's manoeuverability.

Yet another application known to this inventor affixes the electrical motor between the bicycle's pedals. In this fashion, the motor's rotation axle is aligned generally perpendicularly to the bicycle pedals' axle, with the 90° return towards the transmission, by means of worm screws. This configuration makes it unfeasible for the motor to recover energy during braking of the bicycle. This is because the transmission's worm screw decrease in revolutions allows the axle to effect a return rotation in a single direction only, i.e. from the motor to the wheel and not vice-versa. Additionally, the mounting of the motor in this fashion requires that only motors having a small circumference be used due to the problem posed by the limited space available. Such motors, in the experience of this inventor, have a very low torque and a low revolution rate.

Still another application known to this inventor affixes the motor with a direct hold on the wheel roller. In this fashion, the transmission roller is required to exercise great pressure on the bicycle's tire, with resulting wearing down of the tire, and fairly high levels of wasted energy. Also encountered are problems related to clutch slippage such as where dust and water are present on the tire, a condition frequently encountered by bicyclists who travel on unpaved or wet roads.

SUMMARY OF THE INVENTION

It is, therefore, a principal object of this invention to provide a new, useful, and uncomplicated apparatus in the form of an assembly, or universal kit, which can be mounted to virtually any bicycle and which provides auxiliary electrical power to the bicyclist for reducing the need for exceptional physical strength on the part of the cyclist. It is another object to provide such an apparatus which utilizes the rate of pedal rotation and the pressure exerted by the cyclist on the bicycle pedals to actuate this auxiliary electrical power. It is yet another object of the present invention to provide such an apparatus which is discreet in appearance and does not interfere with the bicycle's original aesthetics. It is still another object to provide such an apparatus which aids the cyclist in pedaling and which allows the cyclist to attain an autonomy of more than 35 kilometers or so which allows the cyclist to have a pleasant and serene bicycle ride. And it is yet another object of the present invention to provide such an apparatus which is easily assembled, which has a high level of efficiency in its use and which can be made such that its cost to the end user is relatively low.

The present invention has obtained these objects. It provides for a new, useful and uncomplicated assembly or kit which includes an electrical motor which is mountable to the pedal axle of a typical bicycle, the electric motor having permanent magnets, an electronic control for these motor magnets, batteries and a reduction gear based upon the motor's number of revolutions per minute. The assembly also uses special sensors which register the pedal rotation rate and the pressure exerted by the bicyclist upon the pedals, which information is processed by a control device which controls actuation of the electric motor as such is required by the bicyclist. That is, the control notices how much current is being absorbed by the motor and reacts accordingly. For example, if the cyclist is riding slowly on level ground, the control reads this and sends very little energy to the motor as it is not needed. If, instead, the cyclist is on a steep incline, the number of rotations of the pedal may be the same as on level ground. However, the pressure exerted on the pedal by the cyclist is greater and the electronic control senses this additional pressure. Additional electric current is sent to the motor as more assistance is needed for the cyclist.

The assembly or kit of the present invention is also universal. That is, it can be easily affixed to any type of bicycle, regardless of whether it is presently in use or still remains to be built. The assembly or kit can be affixed to the gear box of the original pedals, with the electrical motor placed between the pedals and the rotation axle which allows the motor to have a larger circumference and, in turn, allows the device to achieve a considerable increase in low revolution torque. This lower number of revolutions is achieved by use of a chain reduction gear, both by the motor in relation to the return axle as well as in relation to the bicycle's transmission rim. Use of the device does not alter the basis upon which any bicycle may be designed or built. That is, the device is fully functional notwithstanding the bicycle's original cost, simplicity of construction or its level of efficiency. Furthermore, maintaining the bicycle's original chain transmission system means that the cyclist can take advantage of the bicycle's standard gear box ratio with a further gearing-down of the motor/wheel ratio.

A further advantage provided by the kit which is the subject of this invention is that it is functionally adapted to be attached to a single place on the bicycle. In this fashion, it can be made to oscillate and thus react, as previously alluded to, both to the pressure exerted on the pedals as well as to the counter-reaction of the rear wheel (by virtue of its resistant torque). This permits special sensors to interpret the situation to which the bicyclist finds himself or herself, namely, the type of start, the gradient, and the level area, thereby making the device take the appropriate action in real time by modulating the motor's electrical current. Additionally, if the bicyclist wishes to increase his or her mileage autonomy, the cyclist can activate a pulley block by means of a magnetic friction on the return axle. This will enable the cyclist to recoup energy, both in braking as well as in climbing, insofar as the kinetic energy from the rear wheel to the motor will be transformed into electrical energy by the motor itself. This partially recharges the batteries, thus resulting in a decrease in the batteries' electrical stress and a lengthening of their useful life. The foregoing and other features of the device of the present invention will be apparent from the detailed description which follows.

DETAILED DESCRIPTION

Figure 1:
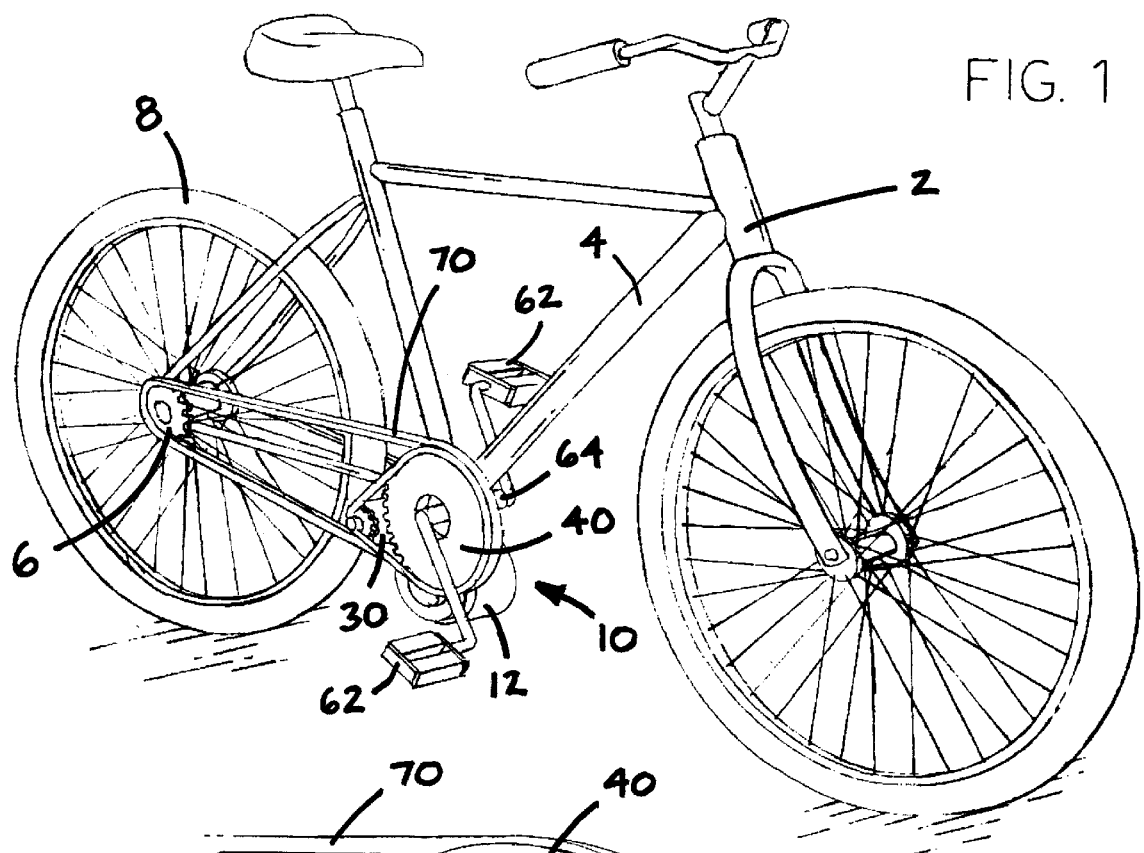
FIG. 1 is a front and left side perspective view of a bicycle which utilizes an assembly constructed in accordance with the present invention.

Referring now to the drawings in detail, wherein like numerals represent like elements throughout, FIG. 1 illustrates a standard bicycle 2 which utilizes a preferred embodiment of the assembly or kit, generally identified 10, constructed in accordance with the present invention. The standard bicycle 2 shown includes a frame 4 which supports, among other things, a pedal mechanism having a pair of pedals 62 and a rear wheel 8. A conventional bicycle chain 70 is used to force rotation of the rear wheel drive sprocket 6 and rotate the rear wheel 8.

Figure 2:
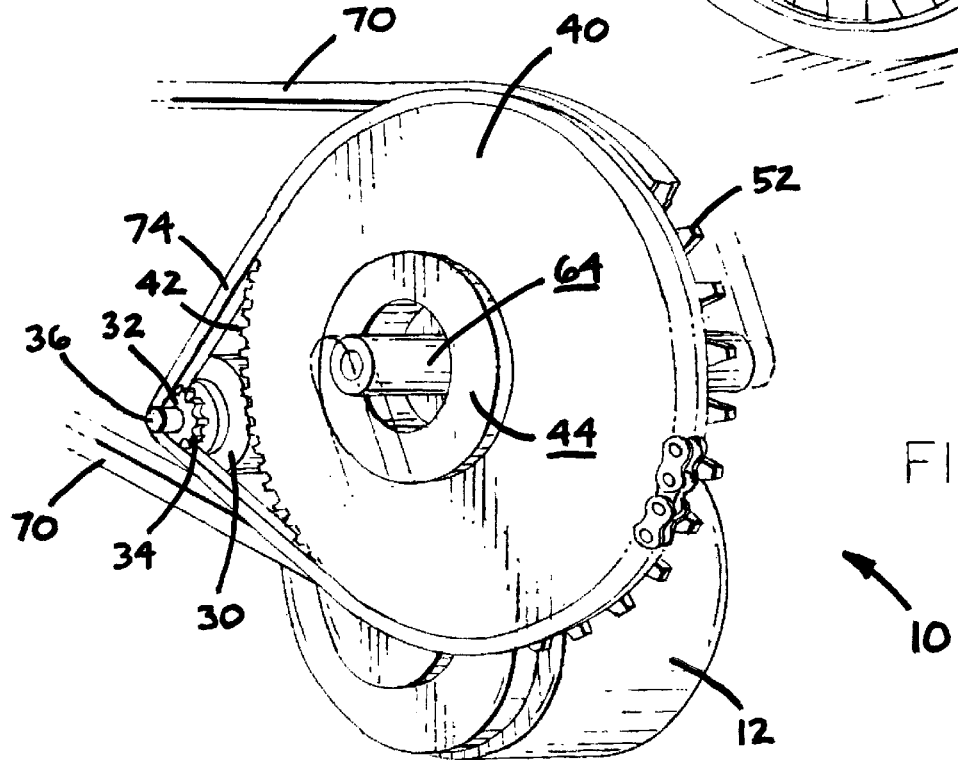
FIG. 2 is an enlarged front and left side perspective view of the assembly constructed in accordance with the present invention.

FIG. 2 illustrates the kit, or assembly, 10 in enlarged detail. As shown, the assembly 10 includes an electric motor 12. The motor 12 consists of a series of permanent magnets which are controlled, in turn, by an electrical current system using microprocessors that analyze a number of physical factors, the details of which will be presented later in this detailed description. The motor 12 is mounted immediately below the pedal axis 60. The motor 12 is electrically powered by a direct current power supply, such as batteries (not shown), which can be mounted almost anywhere within the vicinity of or as part of the assembly 10. The type and location of such power supply is not a limitation of this invention.

It is to be understood that, in application of the assembly 10 to a standard bicycle 2, the original pedal axis or axle 66 of the bicycle 2 provides the anchor point for the assembly 10. In this fashion, the pedal axis 60 is essentially relocated from its old position to a new position, slightly forward from its old position. See FIG. 3. The significance of this relocation will become further apparent later in this detailed description.

The motor 12 includes a motor drive sprocket 14, the teeth 16 of which are used to drive a chain 72. For reference purposes, the motor drive sprocket 14 and chain 72 are situated to the bicyclist's left side of the bicycle 2. The chain 72, when actuated, rotates a transmission sprocket 20 by using a plurality of teeth 22 which mesh with the chain 72. The transmission sprocket 20 also includes a free wheel bearing 24 which allows one-way rotation of a redirect axis 30 which is otherwise functionally attached to the transmission sprocket 20. The concept here is to transfer mechanical power generated by the electrical motor 12 from the motor 12 to the redirect axis 30, thereby transferring power to the other side of the bicycle frame 4. See FIG. 2. The redirect axis 30 includes a return redirect axle 36 at its center. The return axle 36 causes the movement of the redirect axis 30 to be transmitted to the other side of the bicycle 2. The return axle 36 includes a sprocket 32 having a plurality of teeth 34 which mesh with and drive a second chain 74, which chain 74 is located to that side of the bicycle 2 which is to the bicyclist's right. The chain 74, in turn, rotates a drive sprocket 40 by using a plurality of teeth 42 which are defined within its perimeter. This drive sprocket 40 is situated immediately adjacent the pedal sprocket 50 of the bicycle 2. See FIG. 3. It is to be noted here that the drive sprocket 40 also includes a free wheel bearing 44 which allows unidirectional movement of the drive sprocket 40 relative to the pedal sprocket 50. When actuated, the drive sprocket 40 assists with or completely takes over rotation of the pedal sprocket 50 such that the chain 70 is rotated about the pedal sprocket 50 and its teeth 52 thereby causing rotation of the rear wheel drive sprocket 6 and powered rotation of the rear wheel 8.

An important characteristic that should be reemphasized at this point is the fact that by using the two free wheel bearings 24, 44 (that is to say, two bearings that turn in only one direction), one of which is inserted on the return axle 36 and the other on the pedal axle 64 at the center of the pedal sprocket 50, allows the bicyclist to pedal as he or she would on a normal bicycle 2 without transmitting the movement to the motor 12 and still arrive at the motor 12 without the pedals 62 following the rotation of the tire 8. In this fashion, the bicyclist can pedal and can use the motor 12 and pedals 62, thus allowing the motor 12 to assist. It should also be mentioned that the precise form that the free wheel bearings 24, 44 take is not a limitation of this invention. An electromagnetic clutch (not shown) may also be provided which would allow for an effective "blocking" of the free wheel bearings 24, 44 when such is desired or required. When used during braking of the bicycle 2, this helps recover kinetic energy and convert it to electrical energy by means of the motor 12 itself, which is thereby converted to a generator and carrying out a partial recharging of the power supply.

Figure 3:
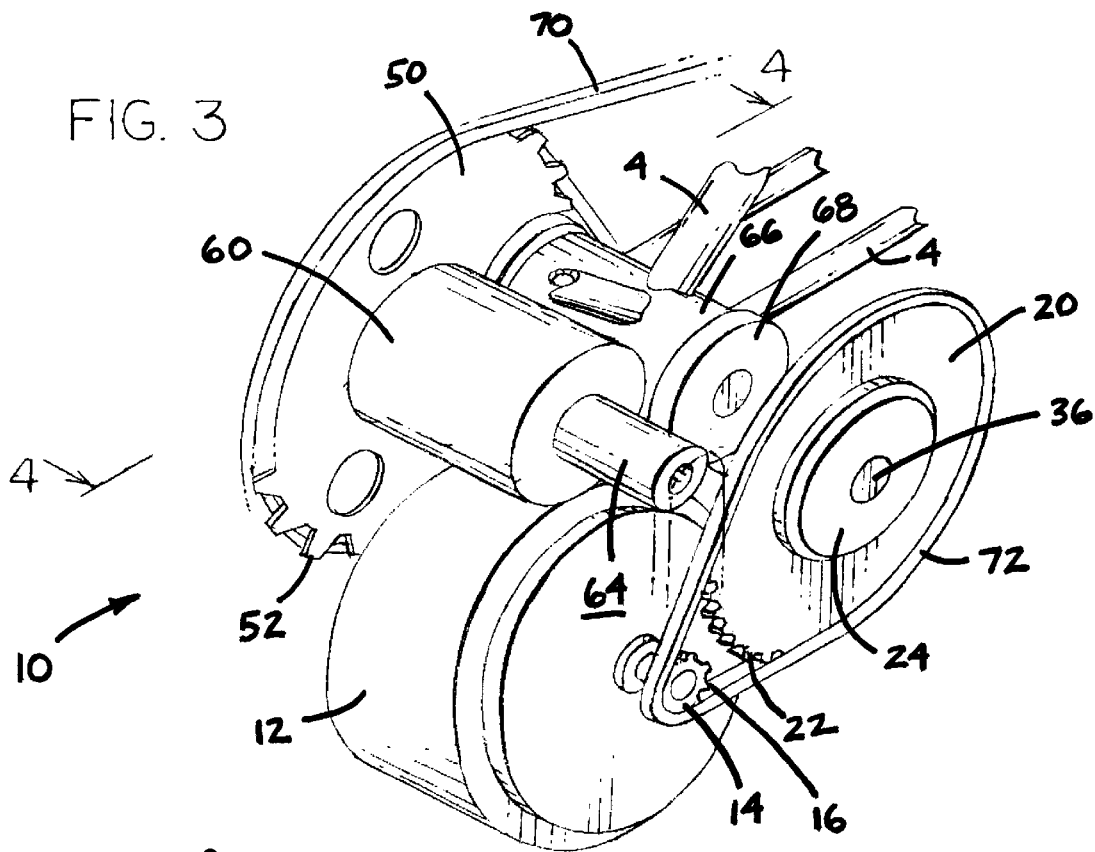
FIG. 3 is a front and right side perspective view of the assembly shown in FIG. 1.
Figure 4:
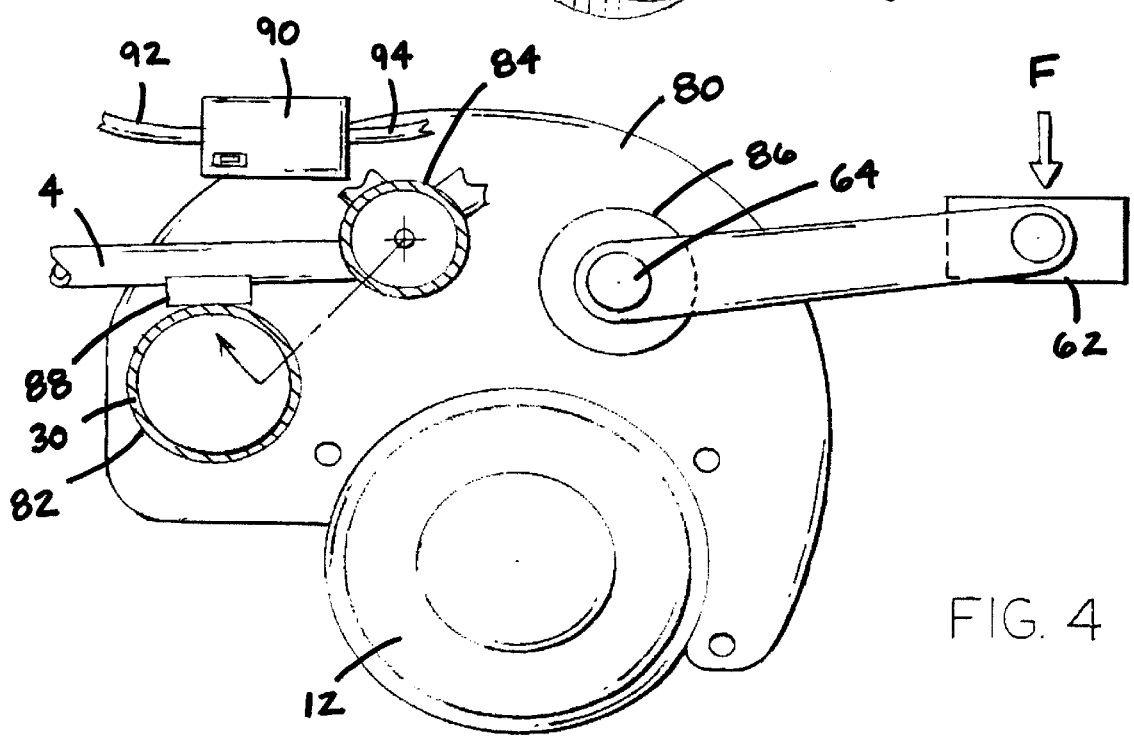
FIG. 4 is a partial sectional view of the assembly taken along line 4—4 of FIG. 3 and showing a left side elevational view of a support plate of the assembly.
Figure 6:
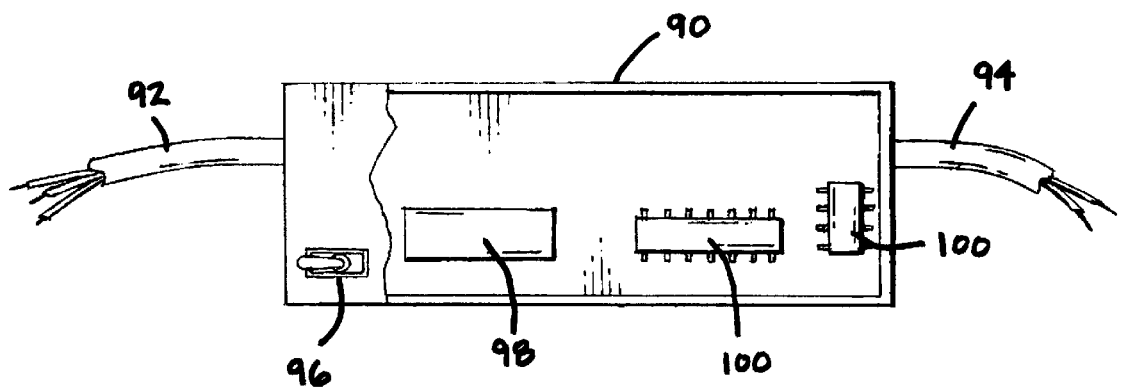
FIG. 6 is a further enlarged view of the control box of the assembly.

Although not shown in FIGS. 2 and 3 for purposes of better illustrating other components of the assembly 10, it is to be understood that the various components of the assembly 10 are held in relative and functional position by virtue of a pair of complimentary plates 80. Each plate 80 is substantially similar to the other in physical configuration, each plate 80 lying in a plane which is essentially parallel to that of the other. See FIG. 4. Although the plate 80 as shown assumes a particular configuration, it is to be understood that a variety of shapes could be configured without deviating from the scope of this invention. As shown, the plate 80 includes a number of apertures, each of which serves a very specific purpose. See FIG. 4. For example, the plate 80 includes a redirect axis aperture 82, a bicycle frame aperture 84 and a pedal axis aperture 86. The redirect axis aperture 82 defined within each plate 80 allows the redirect axis 30 to pass through each plate 80 such that the left side of the bicycle 2 communicates with the right side of the bicycle 2. Similarly, the pedal axis aperture 86 defined within each plate 80 allows similar communication through the plates 80. The bicycle frame aperture 84, however, serves a completely different purpose. The bicycle frame aperture 84, together with the ends 68 of the old pedal axis 66 which is aligned with the aperture 84, serves as a pivot point or fulcrum for the plate 80 and the entire assembly 10. That is, the plate 80 can pivot or "oscillate" ever so slightly about the bicycle. frame aperture 84. As shown in FIG. 4, a pressure sensor 88 is situated between the uppermost portion of the redirect axis 30 and the underside of a portion of the bicycle frame 4 immediately to the rear of the old pedal axis 66. In this fashion, extra pressure F which is exerted by the bicyclist on the pedal 62, such as where the bicyclist is suddenly pedaling up a steep hill, effectively exerts a clockwise force moment M about the pivot point 84 and places the pressure sensor 88 in compression tension. The pressure registered by the pressure sensor 88 is electrically fed back to the control box 90. See FIG. 6. The control box 90 includes a micro processing scheme whereby the electrical signal from the pressure sensor 88 actuates the motor 12 such that the motor 12 is energized to assist the bicyclist with travel up this incline.

A second sensor (not shown) is included in the assembly 10 which provides a somewhat different function. This second sensor is mountable along the plate 80 and electronically reacts to a magnet (also not shown) which is mounted to a pedal 62 in accordance with the Hall effect, i.e. the result of the force that the magnetic's field exerts on the moving negative or positive particles that constitute an electric current through the second sensor. In this fashion, the second sensor effectively measures the number of revolutions of the pedal 62 over a given period of time or the period of each pedal cycle. This information is similarly fed back electrically to the control box 90. See FIG. 6. The micro processing scheme of the control box 90 also allows the electrical signal from this rotational sensor to actuate the motor 12 such that the motor 12 is energized to assist the bicyclist as well.

Figure 5:
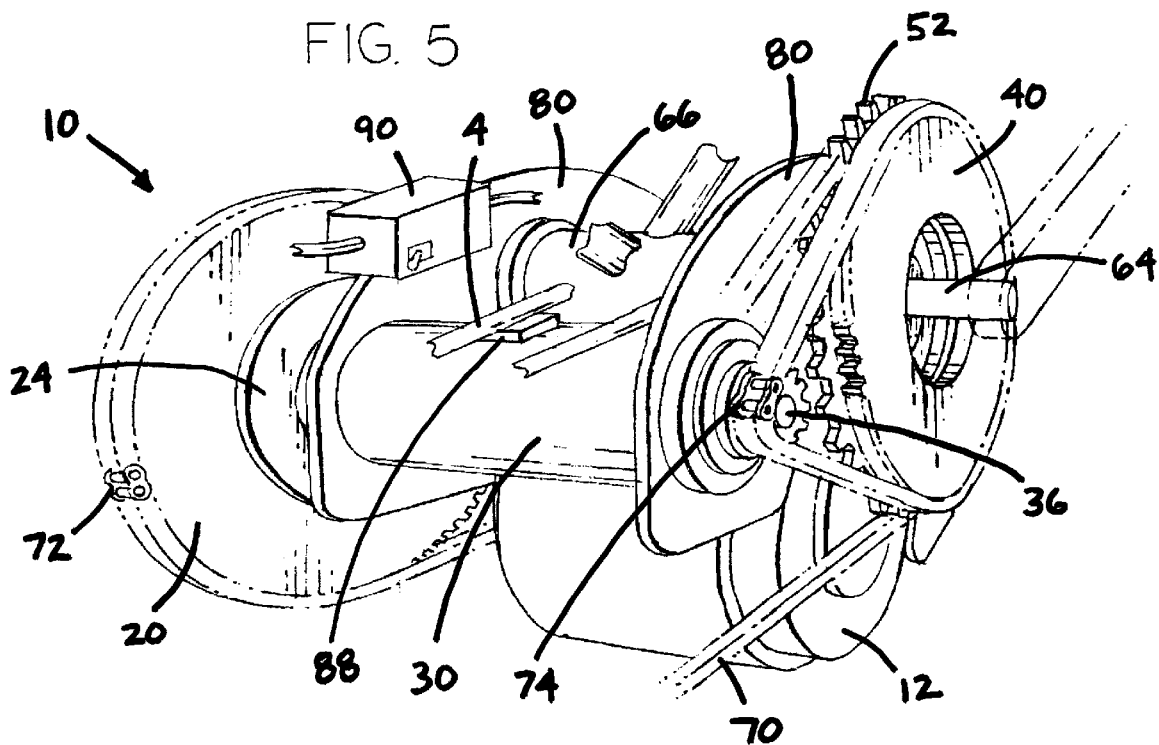
FIG. 5 is a back and right side perspective view of the assembly shown in FIGS. 2 and 3.

An electronic control box 90 can be mounted on or anywhere within the vicinity of the assembly 10. See FIGS. 5 and 6. The control box 90 includes a battery wire 92, a motor wire 94, and an on/off switch 96. Input control 98 is provided to input signals from the sensors and process that information via microprocessors 100 according to a preprogrammed scheme.

In application, rotation of the pedals 62 causes the chain 70 to drive the rear wheel 8. Without any activation of the sensors 88, the bicycle 2 is free of any motor assistance. The same is true when the bicyclist is coasting and not pedaling at all. Where the cyclist is riding slowly on level ground, the control 90 reads this and sends very little energy to the motor 12 as it is not needed. If, instead, the cyclist is on a steep incline, the number of rotations of the pedal 62 may be the same as on level ground. However, the pressure exerted on the pedal 62 by the cyclist is greater and the electronic control 90 senses this additional pressure. Additional electric current is sent to the motor 12 as more assistance is needed for the cyclist.

From the foregoing description of the illustrative embodiment of the invention set forth herein, it will be apparent that there has been provided a new, useful, and uncomplicated kit for universal use with standard bicycles. The kit includes an-electrical motor which is mountable to the pedal axle of a bicycle, the electric motor having permanent magnets, an electronic control for these motor magnets, batteries and a reduction gear based upon the motor's number of revolutions per minute. The kit also uses special sensors which register the pedal rotation rate and the pressure exerted by the bicyclist upon the pedals, which information is processed by a control device which controls actuation of the electric motor as such is required by the bicyclist.

The principles of this invention having been fully explained in connection with the foregoing, I hereby claim as my invention:

1. A universal kit for mechanical transmission of power between an electrical motor and a bicycle chain comprising
   an electric motor,
   a first chain,
   a return axle,
   a transmission sprocket,
   a first unidirectional free wheel bearing between the return axle and the transmission sprocket
   a second chain,
   a drive sprocket,
   a pedal axle,
   a pedal sprocket,
   a second unidirectional free wheel bearing between the pedal axle and the pedal sprocket,
   wherein the electric motor transmits motion to the first chain, which in turn transmits motion to the transmission sprocket, which translates motion to the second chain, which transmits motion to the drive sprocket and the pedal sprocket.

2. The kit of claim 1 wherein the amount of power assistance is regulated by
   a pressure sensor configured to detect increased pedal pressure,
   a control box with a microprocessor
   whereby, when the pressure sensor registers increased pedal pressure, the pressure sensor sends an electrical signal to the control box which then activates the electric motor.

3. The kit of claim 1 in which the electrical motor is affixed between the pedals of the bicycle and has a rotation axle,
   a pedal axle
   wherein the rotation axle is parallel to the pedal axle and wherein one of either the rotational axle or the pedal axle has a circumference larger than the other thereby increasing low motor speed torque.

4. The kit of claim 2 further comprising,
   a transmission sprocket, and
   a gear box transmission,
   wherein the motor transmits power to the transmission sprocket and whereby the ratio of motor speed and wheel speed may be varied.

5. The kit of claim 2 which includes batteries and an electro-magnetic clutch which allows for a direct wheel/motor link which when used during braking helps the motor recover kinetic energy thereby converting it to electrical energy and carrying out a partial recharging of the batteries.

6. A universal kit for mechanical transmission of power between a motor and the wheel of a bicycle, said bicycle having a frame with a rear wheel rotatably mounted to the frame and a conventional rear wheel drive assembly, which assembly includes a drive chain, a pedal sprocket which engages the chain, an original pedal axle and a pair of cooperating foot pedals, one pedal situated to each side of the pedal axle, a kit for providing power assistance to the bicyclist which comprises a direct current electrical power supply, a direct current electric drive motor, means for mounting said drive motor to said original pedal axle, means for relocating said pedal axle and said pedal sprocket means for transmitting mechanical power from said drive motor to said relocated pedal axle and pedal sprocket, a first sensor for detecting changes in pressure applied by the bicyclist to the bicycle pedals, said first sensor generating a corresponding output value, a second sensor for detecting changes in revolution frequency of the pedal sprocket, said second sensor generating a corresponding output value, and a control means for controlling the direct current power supply and the motor based on the output values of the first and second sensors whereby the motor is used to assist the bicyclist in negotiating steep gradients and other road situations with a lesser degree of effort.

7. The kit of claim 6 wherein said pedal axle has a central axis and a pair of axle ends and said motor mounting means includes a pair of cooperating plates, said plates being situated in parallel planar position relative to one another, each plate further being located in a plane which is substantially perpendicular to the axis of the pedal axle with one plate located at each axle end, said motor being attached to and extending between said plates.

8. The kit of claim 7 wherein said pedal axle relocating means includes an aperture defined within each plate, said apertures being cooperatively adapted to receive a pedal axle therewithin, said pedal axle extending generally perpendicularly relative to and between said plates.

9. The kit of claim 8 wherein said relocated pedal axle is located forwardly of said original pedal axle location.

10. The kit of claim 9 wherein said power transmission means includes a redirect axle, said redirect axle having a first and a second end, said first end having a first sprocket attached thereto and said second end having a second sprocket attached thereto, said redirect axle being located rearwardly of said original pedal axle location and extending generally perpendicularly relative to and between said plates.

11. The kit of claim 10 wherein said power transmission means also includes a sprocket attached to said motor and further includes a first transmission chain which engages said motor sprocket and the first sprocket of said redirect axle whereby electrical activation of the motor mechanically drives said first transmission chain and rotates said redirect axle.

12. The kit of claim 11 wherein said power transmission means further includes an auxiliary pedal sprocket which is located adjacent the pedal sprocket.

13. The kit of claim 12 wherein said power transmission means further includes a second transmission chain which engages said auxiliary pedal sprocket and said second redirect axle sprocket whereby mechanical rotation of the redirect axle drives said second transmission chain and rotates said auxiliary pedal sprocket.

14. The kit of claim 13 wherein said auxiliary pedal sprocket and said pedal sprocket are cooperatively attached by means of a free wheel bearing.

15. The kit of claim 14 wherein said redirect axle and said first redirect axle sprocket are coopeeratively attached by means of a free wheel bearing.

16. The kit of claim 15 wherein said bicycle frame includes a frame member extending rearwardly from said original pedal axle and said first sensor is located between said frame member and said redirect axle whereby pressure applied to the bicycle pedals creates an oscillation about the original pedal axle and exerts pressure on said first sensor.

17. The kit of claim 16 wherein said second sensor is attached to said assembly and includes a magnet attached to a pedal whereby a Hall effect current is induced in said second sensor as the magnet passes over it.

18. The kit of claim 17 wherein said control means includes an electro-magnetic clutch for converting the motor to an electrical generator.

* * * * *